(12) United States Patent
Lim et al.

(10) Patent No.: US 11,741,570 B2
(45) Date of Patent: Aug. 29, 2023

(54) IMAGE PROCESSING DEVICE AND IMAGE PROCESSING METHOD OF SAME

(71) Applicants: SAMSUNG ELECTRONICS CO., LTD., Suwon-si (KR); SOGANG UNIVERSITY RESEARCH & BUSINESS DEVELOPMENT FOUNDATION, Seoul (KR)

(72) Inventors: Hyungjun Lim, Suwon-si (KR); Suk Ju Kang, Seoul (KR); Sung In Cho, Gyeongsan-si (KR); Youngsu Moon, Suwon-si (KR); Seung Joon Lee, Seoul (KR); Siyeong Lee, Seoul (KR)

(73) Assignees: SAMSUNG ELECTRONICS CO., LTD., Suwon-si (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 172 days.

(21) Appl. No.: 17/279,182

(22) PCT Filed: Feb. 14, 2019

(86) PCT No.: PCT/KR2019/001798
§ 371 (c)(1),
(2) Date: Mar. 24, 2021

(87) PCT Pub. No.: WO2020/111387
PCT Pub. Date: Jun. 4, 2020

(65) Prior Publication Data
US 2022/0005153 A1   Jan. 6, 2022

(30) Foreign Application Priority Data
Nov. 29, 2018 (KR) .................. 10-2018-0151429

(51) Int. Cl.
*G06T 3/40* (2006.01)
*H04N 19/176* (2014.01)
*H04N 19/59* (2014.01)

(52) U.S. Cl.
CPC ............. *G06T 3/40* (2013.01); *H04N 19/176* (2014.11); *H04N 19/59* (2014.11)

(58) Field of Classification Search
CPC .......... G06T 3/4069; H04N 21/234372; H04N 7/0122
See application file for complete search history.

(56) References Cited

U.S. PATENT DOCUMENTS 7,315,331 B2   1/2008   Franzen
7,949,205 B2   5/2011   De Haan et al.
(Continued)

FOREIGN PATENT DOCUMENTS

JP   2006504175 A   2/2006
KR   1020120082336 A   7/2012
(Continued)

OTHER PUBLICATIONS

Seam Carving for content aware image resizing; 2007 (Year: 2007).*
(Continued)

*Primary Examiner* — Luis Perez-Fuentes
(74) *Attorney, Agent, or Firm* — Sughrue Mion, PLLC

(57) ABSTRACT

Disclosed is an image processing device. The image processing device includes an input unit, and a processor which retargets an image frame input through the input unit and acquires an output image frame, wherein the processor identifies an area, in which pixel values are to be padded, on the basis of the input image frame and information about the output image frame, identifies a first pixel block on the basis of a target pixel area included in the identified area, identifies (Continued)

a second pixel block on the basis of pixel values included in the first pixel block, and pads the target pixel area on the basis of pixel values included in the second pixel block, so as to able to acquire the output image frame.

15 Claims, 20 Drawing Sheets

(56) References Cited

U.S. PATENT DOCUMENTS

| | | | |
|---|---|---|---|
| 7,969,294 B2* | 6/2011 | Yamamoto | G01C 21/36 |
| | | | 345/9 |
| 9,245,043 B2* | 1/2016 | Liu | G06F 16/9554 |
| 9,582,928 B2 | 2/2017 | Cho et al. | |
| 10,015,413 B1* | 7/2018 | Woodman | G06T 3/4069 |
| 10,140,685 B2 | 11/2018 | Lee et al. | |
| 10,205,978 B2* | 2/2019 | Shaw | H04N 21/44029 |
| 10,284,842 B2 | 5/2019 | Ramasubramonian et al. | |
| 10,368,013 B2* | 7/2019 | Woodman | H04N 5/2628 |
| 10,885,879 B2* | 1/2021 | Kast | G09G 5/363 |
| 2004/0001624 A1 | 1/2004 | Curry et al. | |
| 2008/0246759 A1 | 10/2008 | Summers | |
| 2017/0272651 A1 | 9/2017 | Mathy et al. | |
| 2017/0365037 A1 | 12/2017 | Urban et al. | |
| 2020/0058165 A1 | 2/2020 | Choi et al. | |

FOREIGN PATENT DOCUMENTS

| | | |
|---|---|---|
| KR | 1020150122767 A | 11/2015 |
| KR | 1020160027760 A | 3/2016 |
| KR | 1020180042627 A | 4/2018 |
| KR | 1020180080120 A | 7/2018 |

OTHER PUBLICATIONS

Content aware image resizing using Seam Carving with human attention model—2008. (Year: 2008).*
Seam Carving for content aware image resizing; Avidan—2007 (Year: 2007).*
Optimized scale and stretch for image resizing; Wang—2008 (Year: 2008).*
Content aware image resizing—2008. (Year: 2008).*
Written Opinion (PCT/ISA/237) dated Aug. 28, 2019 issued by the International Searching Authority in International Application No. PCT/KR2019/001798.
International Search Report (PCT/ISA/210) dated Aug. 28, 2019 issued by the International Searching Authority in International Application No. PCT/KR2019/001798.
Aides, A., et al., "Multiscale Ultrawide Foveated Video Extrapolation", 2011, 8 pages.

* cited by examiner

IMAGE PROCESSING DEVICE AND IMAGE PROCESSING METHOD OF SAME

TECHNICAL FIELD

The disclosure relates to an image processing apparatus and an image processing method thereof. More particularly, the disclosure relates to an image processing apparatus for obtaining an output image by retargeting an input image, and an image processing method thereof.

BACKGROUND ART

Supported by the development of electronic technology, various types of electronic devices have been developed and provided. Display devices used in various places such as a home, an office, and a public place have been continuously developed over the past several years.

In recent years, demands for high-resolution image services and real-time streaming services has been significantly increasing.

In some cases, when a resolution of an input image and an output resolution are different, image processing to match the input image to the output resolution is applied. However, when a resolution of an input image and an aspect ratio of an output resolution are the same, there is no image distortion, but when the aspect ratio is different, there is a problem that image distortion may occur due to an aspect ratio adjustment.

DETAILED DESCRIPTION OF THE INVENTION

Technical Problem

The disclosure is in accordance with the necessity described above, and an object of the disclosure is to provide an image processing apparatus capable of obtaining an output image by adjusting an aspect ratio of an input image without image distortion through similar pixel padding, and an image processing method thereof.

Technical Solution

According to an embodiment of the disclosure, an image processing apparatus includes an input unit, and a processor configured to retarget an image frame input through the input unit and acquire an output image frame, wherein the processor is configured to identify an area, in which pixel values are to be padded, based on the input image frame and information about the output image frame, identify a first pixel block based on a target pixel area included in the identified area, identify a second pixel block based on pixel values included in the first pixel block and acquire the output image frame by padding the target pixel area based on pixel values included in the second pixel block.

The processor may be configured to scale the input image frame based on an aspect ratio of the input image frame, identify the area to be padded based on the scaled image frame and information about the output image frame, and identify the second pixel block in the scaled image frame.

The processor may be configured to identify the second pixel block by searching pixel values included in the first pixel block and a pixel block having similarity greater than or equal to the threshold value.

The processor may be configured to identify a foreground area in the input image frame, and perform re-research based on the second pixel block being searched in at least one of the foreground area or an adjacent area.

The processor may be configured to pad pixels included in the first pixel block with pixel values of corresponding pixels among the pixels included in the second pixel block.

The processor may be configured to replace some pixels having pixel values among pixels included in the first pixel block with pixel values calculated based on pixel values of corresponding pixel and pixel values of corresponding pixel among the second pixel block.

The processor may be configured to pad pixels included in the target pixel area with pixel values of corresponding pixel among the pixels included in the second pixel block.

The processor may be configured to acquire motion information of the input image frame, and blur the area in which the pixel values are padded based on the motion information.

The processor may be configured to, based on the foreground area of the input image frame being included in the area in which the pixel values are padded, blur the area in which the pixel values are padded based on the motion information being equal to or greater than a threshold value, and maintain the area in which the pixel values are padded based on the motion information being less than the threshold value.

The processor may be configured to pad the target pixel area of each of a plurality of fames included in a predetermined frame section with pixel values included in the second pixel block.

The apparatus may further include a display, wherein the processor is configured to control the display to display the acquired output image frame.

According to an embodiment of the disclosure, an image processing method of retargeting an input image frame to acquire an output image frame, the method includes identifying an area, in which pixel values are to be padded, based on the input image frame and information about the output image frame, identify a first pixel block based on a target pixel area included in the identified area, identifying a second pixel block based on pixel values included in the first pixel block, and acquiring the output image frame by padding the target pixel area based on pixel values included in the second pixel block.

The identifying the second pixel block may be configured to scale the input image frame based on an aspect ratio of the input image frame, identify the area to be padded based on the scaled image frame and information about the output image frame, and identify the second pixel block in the scaled image frame.

The identifying the second pixel block may be configured to identify the second pixel block by searching pixel values included in the first pixel block and a pixel block having similarity greater than or equal to the threshold value.

The identifying the second pixel block may be configured to identify a foreground area in the input image frame, and perform re-research based on the second pixel block being searched in at least one of the foreground area or an adjacent area.

The acquiring the output image frame may be configured to pad pixels included in the first pixel block with pixel values of corresponding pixels among the pixels included in the second pixel block.

The acquiring the output image frame may be configured to replace some pixels having pixel values among pixels included in the first pixel block with pixel values calculated based on pixel values of corresponding pixel and pixel values of corresponding pixel among the second pixel block.

The acquiring the output image frame may be configured to pad pixels included in the target pixel area with pixel values of corresponding pixel among the pixels included in the second pixel block.

The acquiring motion information on the input image frame may further include blurring the area in which the pixel values are padded based on the motion information.

The blurring may be configured to, based on the foreground area of the input image frame being included in the area in which the pixel values are padded, blur the area in which the pixel values are padded based on the motion information being equal to or greater than a threshold value, and maintain the area in which the pixel values are padded based on the motion information being less than the threshold value.

The acquiring the output image frame may be configured to pad the target pixel area of each of a plurality of fames included in a predetermined frame section with pixel values included in the second pixel block.

According to an embodiment of the disclosure, a non-transitory computer-readable medium, when executed by a processor of an image processing apparatus that retargets an image frame to acquire an output image frame, storing computer instructions such that the image processing apparatus performs an operation, the operation includes identifying an area, in which pixel values are to be padded, based on the input image frame and information about the output image frame, identify a first pixel block based on a target pixel area included in the identified area, identifying a second pixel block based on pixel values included in the first pixel block, and padding the target pixel area based on pixel values included in the second pixel block to acquire the output image frame.

Effect of the Invention

According to various embodiments of the disclosure, it is possible to acquire an output image by adjusting an aspect ratio of an input image without image distortion. For example, there is no possibility of losing a major area of an image, and temporal coherency in video content can be maintained.

MODE FOR IMPLEMENTING THE DISCLOSURE

Figure 1:
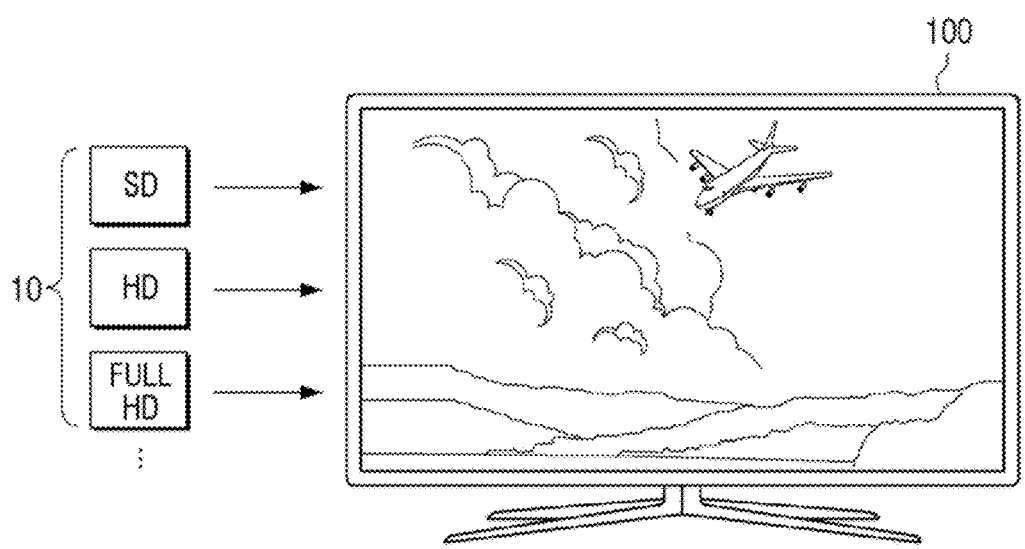
FIG. 1 is a view illustrating an embodiment of an image processing apparatus according to an embodiment.

Hereinafter, the disclosure will be described in detail with reference to the accompanying drawings.

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

At least one of A and B is to be understood as representing either "A" or "B" or "A and B".

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

FIG. 1 is a view illustrating an example implementation of an image processing apparatus according to an embodiment of the disclosure.

The image processing apparatus 100 may be implemented as a TV or a set-top box as shown in FIG. 1, but is not limited thereto, and devices with image processing and/or display functions such as a smart phone, a tablet PC, a notebook PC, a head mounted display (HMD), a near eye display (NED), large format display (LFD), digital signage, digital information display (DID), video wall, projector display, camera, etc. are applicable without limitation.

The image processing apparatus 100 may receive various compressed images or images of various resolutions. For example, the image processing apparatus 100 may receive an image in a compressed form such as a moving picture experts group (MPEG) (e.g., MP2, MP4, MP7, etc.), joint photographic coding experts group (JPEG), advanced video coding (AVC), H.264, H.265, high efficiency video codec (HEVC), or the like. Alternatively, the image processing apparatus 100 may receive any one of standard definition (SD), high definition (HD), Full HD, and Ultra HD images.

According to an embodiment, when the resolution of the input image and the aspect ratio of the output resolution are different, a retargeting processing for adjusting the resolution of the input image to the output resolution is required. For example, the resolution of the input image is a Full HD or HD image and the output resolution of the image is Ultra HD, the image may be retargeted. In this case, as the aspect ratio of the input image is adjusted to match the aspect ratio of the output image, there is a problem in that image distortion occurs.

Accordingly, in the disclosure, when the resolution of the input image and the aspect ratio of the output resolution are different, various embodiments capable of minimizing image distortion will be described.

Figure 2:
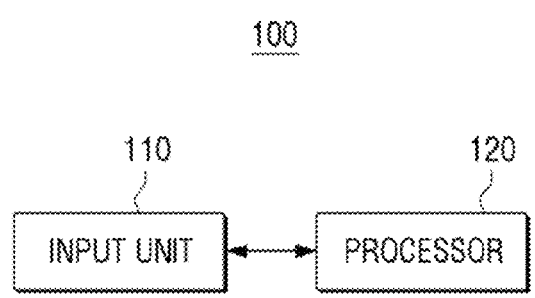
FIG. 2 is a block diagram illustrating a configuration of an image processing apparatus according to an embodiment.

FIG. 2 is a block diagram illustrating a configuration of an image processing apparatus according to an embodiment.

Referring to FIG. 2, an image processing apparatus 100 may include an input unit 110 and a processor 120.

The input unit 110 receives various types of content. For example, the input unit 110 may receive image signals from an external device (e.g., a source device), an external storage medium (e.g., USB), an external server (e.g., web hard), or the like through a communication method such as AP-based Wi-Fi (Wi-Fi, Wireless LAN network), Bluetooth, Zigbee, wired/wireless LAN (Local Area Network), WAN, Ethernet, IEEE 1394, high definition multimedia interface (HDMI), mobile high-definition link (MHL), universal serial bus (USB), display port (DP), Thunderbolt, video graphics array (VGA) port, RGB port, D-subminiature (D-SUB), digital visual interface (DVI), or the like in a streaming or downloading method. Herein, the image signal may be a digital signal, but is not limited thereto.

The processor 120 may control an overall operation of the image processing apparatus 100.

According to an embodiment, the processor 120 may be implemented as a digital signal processor (DSP), a microprocessor, or a time controller (TCON) that processes a digital image signal, but is limited thereto. In addition, the processor may include one or more of a central processing unit (CPU), a micro controller unit (MCU), a micro processing unit (MPU), a controller, an application processor (AP), or a communication processor (CP), ARM processor, or may be defined by a corresponding term. In addition, the processor 140 may be implemented as a system on chip (SoC) or large-scale integration (LSI) with a built-in processing algorithm, or may be implemented in the form of a field programmable gate array (FPGA).

The processor 120 acquires an output image frame by retargeting an image frame input through the input unit 110, that is, adjusting its aspect ratio.

Specifically, the processor 120 may identify an area in which pixel values are to be padded based on information on the output image frame and the input image frame. Here, the information on the output image frame may be information on a resolution of the output image frame.

For example, the processor 120 may identify an area in which pixel values are to be padded based on an input image frame and retargeting information, and identify a first pixel block (or a first pixel area) based on a target pixel area included in the identified area. Herein, the retargeting information may include resolution information of an input image frame and resolution information of an output image frame. Alternatively, the retargeting information may include an aspect ratio of an input image frame and an aspect ratio of an output image frame. Alternatively, the retargeting information may include aspect ratio adjustment information of the input image frame calculated based on resolution information of the input image frame and resolution information of the output image frame.

According to an embodiment, the processor 120 may scale an input image frame based on an aspect ratio of the input image frame, and may identify an area in which pixel values are to be padded based on information on the scaled image frame and the output image frame.

Figure 3:
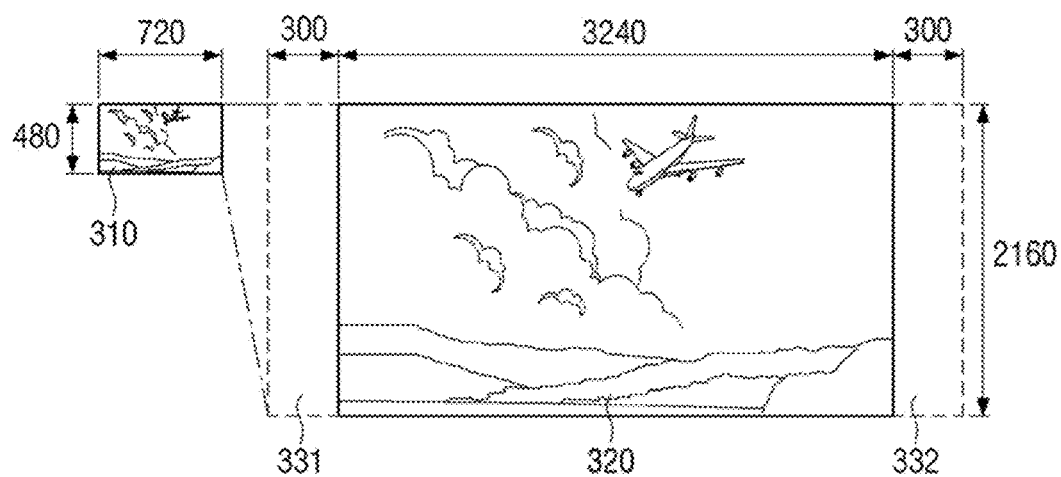
FIG. 3 is a view illustrating a method of adjusting an aspect ratio according to an embodiment.

For example, as shown in FIG. 3, when the resolution of the input image frame 310 is SD (720×480) and the resolution of the output image frame is 4K UHD (3,840×2,160), the processor 120 may scale a horizontal ratio and a vertical ratio by 4.5 times (2160/480). In this case, a vertical length of the scaled image 320 fits the output image frame, but a horizontal length is insufficient by 3840−3240 (720*4.5) =600. In this case, the processor 120 may identify 300 pixel length areas 331 and 332 of the scaled image frame as an area in which pixel values are to be padded (hereinafter, referred to as a pixel padding area).

When the pixel padding area is identified, the processor 120 may identify a first pixel block based on a target pixel area in the identified area. Here, the target pixel area may include at least one pixel. The target pixel area may include a plurality of pixels. However, for convenience of description, it is assumed that the target pixel area includes one pixel.

According to an embodiment, an area in which pixel values are to be padded is identified, the processor 120 may identify a first pixel block having a predetermined size including surrounding pixels with the target pixel area as a center pixel. Here, the predetermined size may be various sizes such as 3*3, 5*5, 7*7, etc., but for convenience of description, it is assumed that 5*5 pixel block is acquired. Here, the pixel block may be implemented as a patch, for example.

The processor 120 may identify a second pixel block (or a second pixel area) based on the pixel value stored in the first pixel block, and pad a target pixel area based on pixel values included in the second pixel block. Here, the second pixel block may be the same as the size of the first pixel block, but is not limited thereto.

According to one embodiment, the processor 120 may identify the second pixel block by searching for a pixel block having a pixel value whose similarity to the pixel value included in the first pixel block is equal to or greater than a threshold value. Most images have a feature of self-similarity, which is the basis of the fractal theory. In other words, assuming that another area similar to one area is included in the image, a pixel area having a high similarity may be identified as the second pixel block after measuring the similarity with respect to another area in the image.

When the second pixel block is identified, according to an embodiment, the processor 120 may pad a pixel included in the target pixel area with a pixel value of a corresponding pixel among pixels included in the second pixel block. For example, if a pixel at a position (3, 3) in the first pixel block of the 5*5 shape is a target pixel area, the processor 120 may pad the corresponding pixel with a pixel value of the corresponding pixel at the position (3, 3) in the second pixel block of the 5*5 shape.

When the second pixel block is identified, the processor 120 may pad the pixels included in the first pixel block with pixel values of corresponding pixels among pixels included in the second pixel block according to another embodiment. For example, the processor 120 may pad the pixels included in the first pixel block with the pixel values of the second pixel block. In other words, each pixel included in the first pixel block may be padded with a pixel value at a corresponding position included in the second pixel block.

In this case, the processor 120 may replace some pixels having a pixel value among the pixels included in the first pixel block with a pixel value calculated based on a pixel value of a corresponding pixel among the corresponding pixel value and the second pixel block. For example, the processor 120 may sum the pixel values of the corresponding pixel values and the pixel values of the corresponding pixels among the second pixel blocks with respect to some pixels having a pixel value among the pixels included in the first pixel block, and then divide the sum by the number of sums to replace it with a calculated pixel value.

Meanwhile, the processor 120 may identify a foreground area in the input image frame, and when a second pixel block is searched in at least one of the foreground area or an adjacent area, perform re-search to search for a new second pixel block.

In addition, the processor 120 may acquire motion information of the input image frame, and may perform blurring of an area in which pixel values are to be padded based on the motion information. Here, the motion information may be global motion information indicating motion of an entire screen. For example, the global motion information may be calculated in consideration of various values such as the amount of change in pixel values of the entire input image frame, at least one pixel block included in the input image frame, for example, the amount of change in pixel values of a plurality of pixel blocks.

According to one embodiment, if the identified foreground area is contained in the padded area with pixel values, the processor 120 may blur the area where the pixel values are padded when the motion information is above the threshold value, and if the motion information is less than the threshold value, the area where the pixel values are padded may be maintained. Here, the foreground area refers to a part to be targeted in a scene where there are two areas in contact with a boundary line (or an area where a viewer's gaze is concentrated most closely captured by a camera), and the other area may be a background area.

After the scene is changed, if the foreground is identified as being on both ends of an image in the first frame, the processor 120 may use a fallback technique that applies uniform scaling instead of the retargeting processing described above. In this case, extreme image quality degradation may be effectively prevented.

For example, as shown in Table 1 below, various embodiments of the invention may be applied for each case.

TABLE 1

| Cases | Detection criteria | Operation | Example |
| --- | --- | --- | --- |
| Foreground in padded area at the start frame | FG ratio in side area | Uniform scaling (until the next scene change) | |
| Appearance of foreground in padded area | GM = 0 FG ratio in padded area & warping blocks | Maintaining padded area | Scrolling text, foreground moving |
| | GM ≠ 0 | Blurring on padded area | |
| Zoom in/out Rapid camera translation (mag. GM ↑) | High matching cost | Blurring on padded area | |

Herein, FG: foreground, GM: global motion, Mag.: magnitude

FIGS. 4A to 4F are views illustrating a pixel padding method according to an embodiment of the disclosure.

Figure 4A:
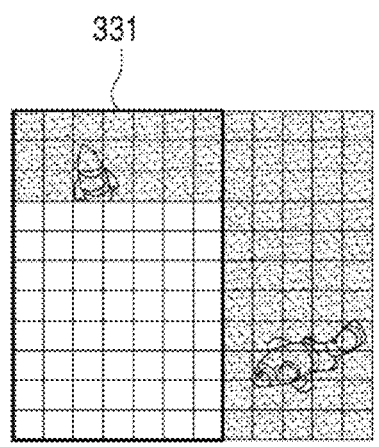
FIGS. 4A to 4F are views illustrating a pixel padding method according to an embodiment.
Figure 4B:
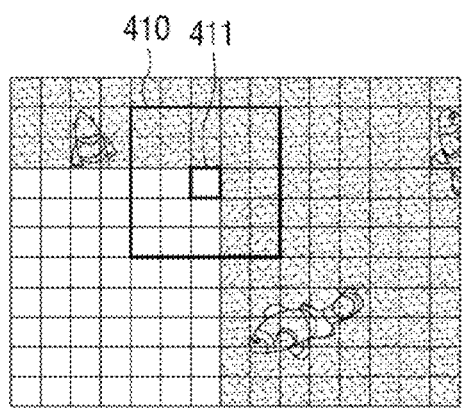

According to an embodiment of the disclosure, when a pixel padding area 331 is identified as shown in FIG. 4A, a first pixel block 410 may be identified based on a target pixel area 411 from the identified area 33 as shown in FIG. 4B. Here, although the target pixel area 411 is illustrated as including one pixel, it is possible to include a plurality of pixels in some cases. In addition, a size of the first pixel block 410 is assumed to be 5*5 for convenience of description.

Figure 4C:
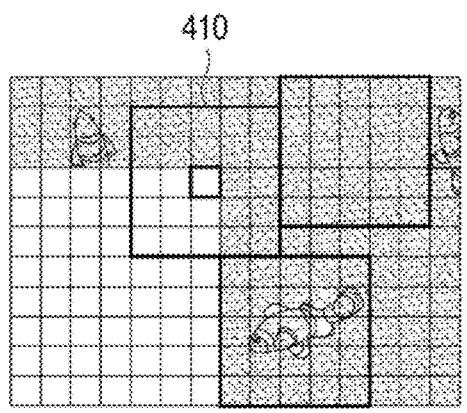

When the first pixel block 410 is identified, a pixel block having pixel values similar to that of the first pixel block 410 is searched based on pixel values included in the first pixel block 410 as shown in FIG. 4C. For example, the similar pixel block may be searched using a cost function for determining similarity. At least one of mean square error (MSE), sum of absolute difference (SAD), median absolute deviation (MAD), and correlation may be used as the cost function for determining similarity, but is not limited thereto. For example, when MSE is applied, the similar pixel block may be identified by searching for a patch having a high similarity from a viewpoint of the MSE, that is, a patch having a small MSE difference. As another example, similar pixel blocks may be identified based on the sum of the difference between pixel values included in both pixel blocks. In this case, a difference of pixel values may be calculated for a location where a pixel value exists in both pixel blocks. As another example, a similar pixel block may be identified based on a total number of foreground pixels in the adjacent pixel block. As another example, a similar pixel block may be identified by using a difference from pixel values calculated in a previous frame.

Figure 4D:
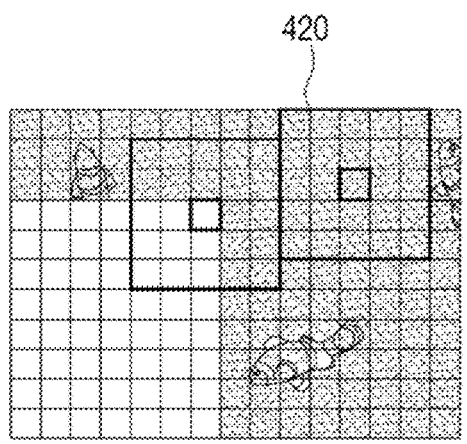
Figure 4E:
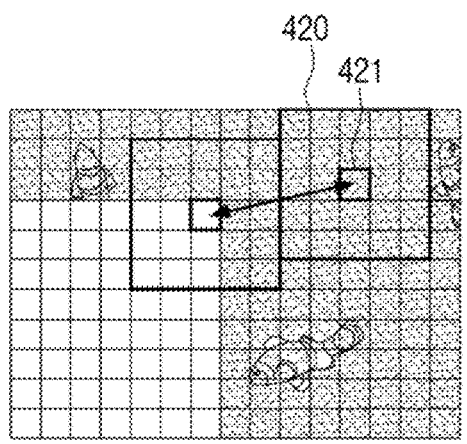
Figure 4F:
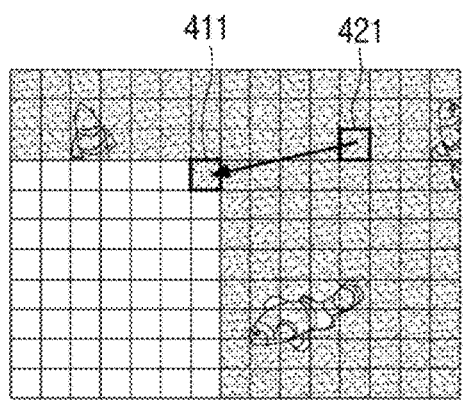

As illustrated in FIG. 4D, a second pixel block 42 having a pixel value similar to the first pixel block 410 is identified, a pixel value corresponding to a target pixel area 411 may be identified from a pixel value included in the second pixel block 420 as illustrated in FIG. 4E. As illustrated in FIG. 4F, the target pixel area 411 may be padded based on the identified pixel values.

Figure 5A:
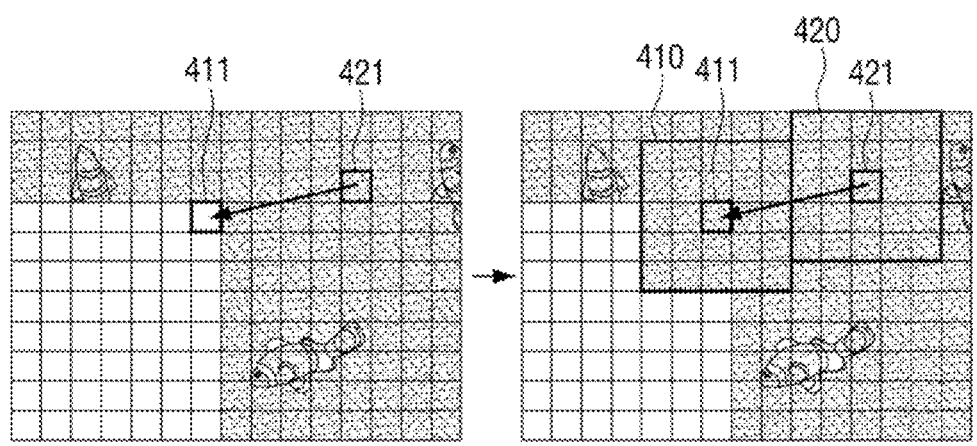
FIGS. 5A and 5B are views illustrating a pixel padding method according to another embodiment.
Figure 5B:
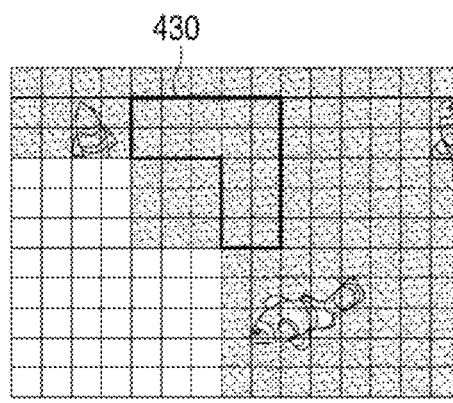

According to an embodiment, only the target pixel area 411 may be padded as shown in FIG. 4F, but according to another embodiment, as shown in FIG. 5A, the first pixel block 410 may be replaced with the second pixel block 420. In other words, each pixel included in the first pixel block 410 may be padded with a pixel value at a corresponding position included in the second pixel block 420. In this case, when pixels 430 overlapping existing pixel values in the first pixel block 410 as shown in FIG. 5B, existing pixel values and newly padded pixel values may be accumulated and then filled with pixel values obtained by dividing the accumulated pixel values by the accumulated number of times. However, it is not limited thereto, pixel values to be padded may be calculated in various ways, such as a maximum or minimum value among them, an average value of the existing pixel value to which a first weight is applied and a newly padded pixel value to which a second weight is applied, and a value by applying a third weight to the maximum or minimum value among them.

Meanwhile, the various embodiments described above may be performed in units of a predetermined frame section (e.g., in units of scenes). According to an embodiment, the processor 120 may pad a target pixel area of each of a plurality of frames included in the same scene section with pixel values included in the second pixel block. For example, among the plurality of frames included in the same scene section, a target pixel area of the remaining frame may be searched for and padded with a pixel value at a relative position of the first pixel in the second pixel block determined in the first frame. Accordingly, relative positions of pixel values to be used for the pixel padding area 331 in the plurality of frames included in the same scene section may be the same. In other words, pixel values at the same relative position may be displayed in the same scene section. According to another embodiment, when pixel values of the pixel padding area 331 included in the first frame is determined in the same scene section, determining the pixel values of the pixel padding area 331 by applying an appropriate weight to a subsequent frame may also be possible.

Meanwhile, when the scene is changed, the processor 120 may search for a new similar pixel block through the operation described above to pad a target pixel area. However, in order to maintain temporal coherency, pixel padding may be performed in the current scene by using the same relative position of pixels used for padding in the previous scene. Alternatively, pixel padding may be performed using the same pixel position values moved to padding in a plurality of previous scenes according to image characteristics of each scene in the current scene.

Figure 6:
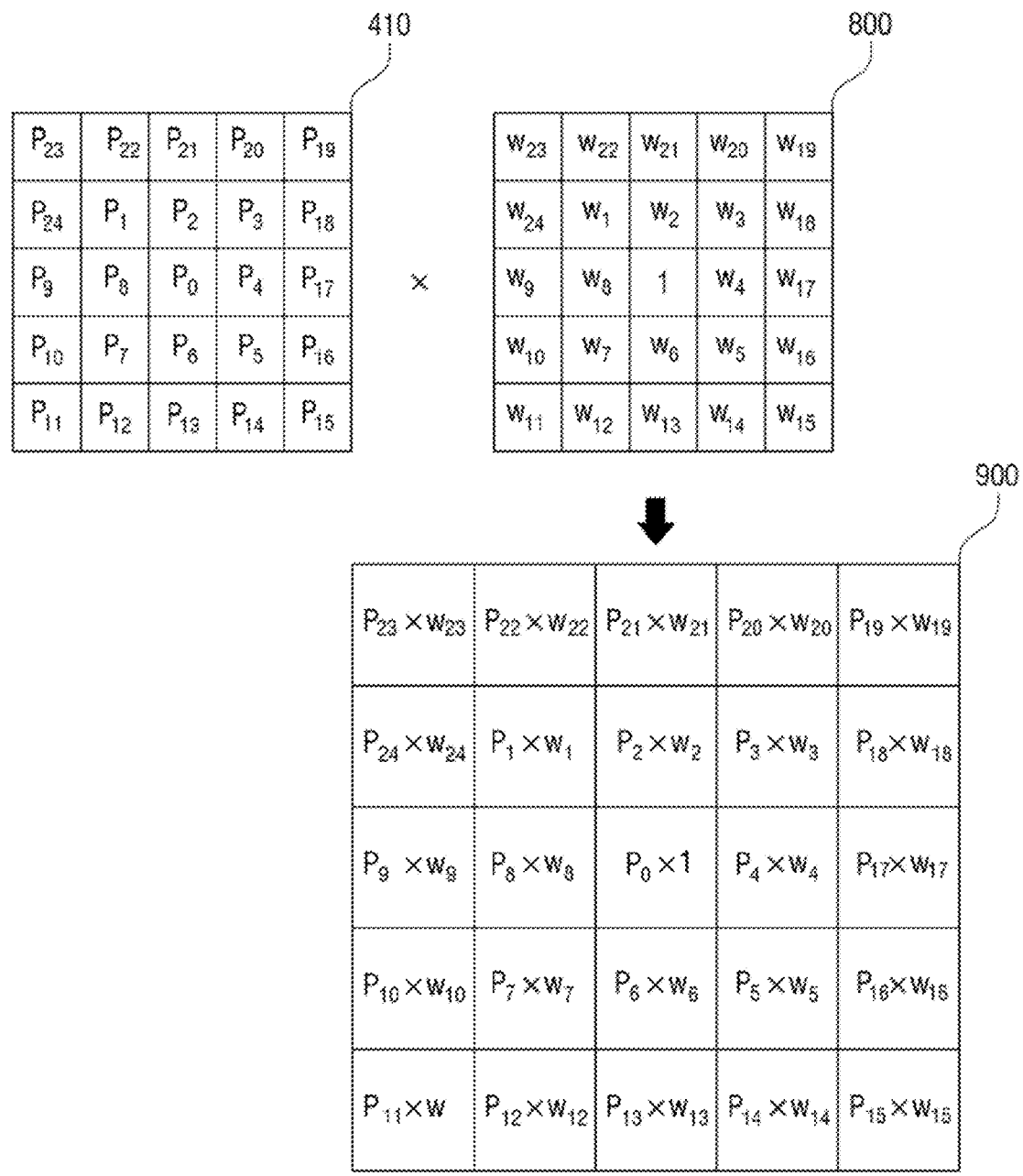
FIG. 6 is a view illustrating a pixel padding method according to another embodiment.

FIG. 6 is a view illustrating a pixel padding method according to another embodiment of the disclosure.

As shown in FIG. 6, after padding the pixel values identical to the pixel values of FIG. 4F (or FIG. 5A), an output image may be acquired by multiplying each pixel block included in the padded pixel block 410 in which pixel values are padded by a predetermined weight.

Figure 7A:
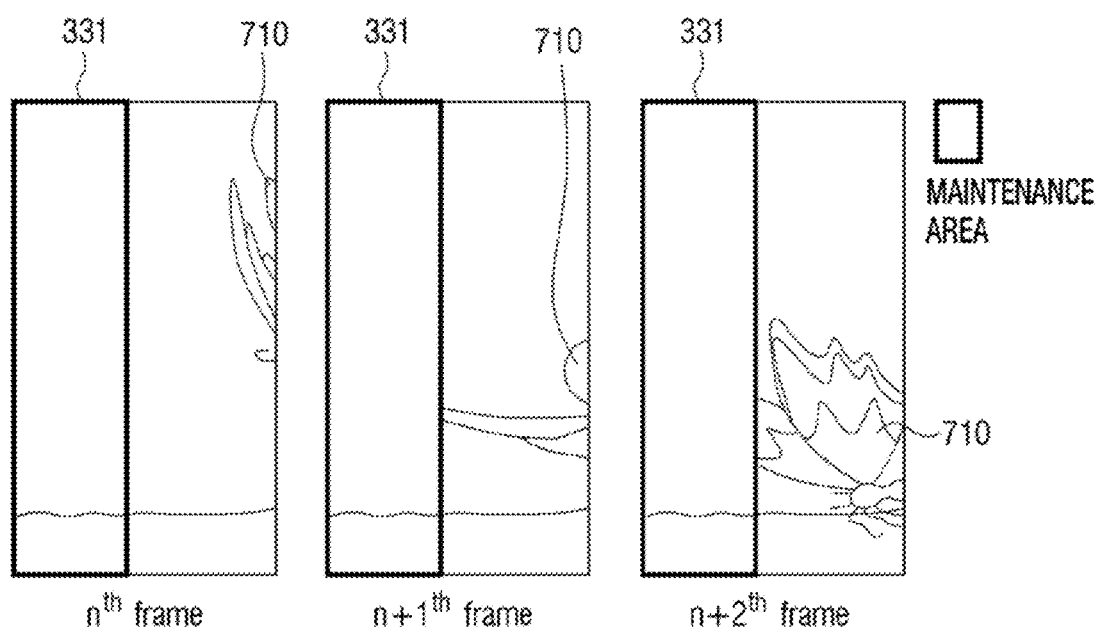
FIGS. 7A and 7B are views illustrating a pixel padding method according to another embodiment.
Figure 7B:
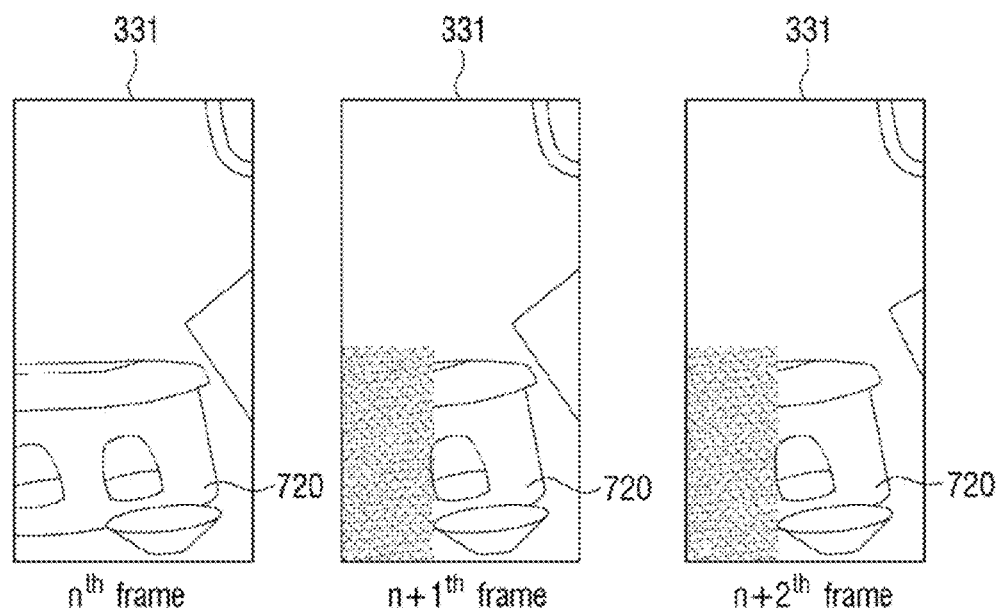

FIGS. 7A and 7B are views illustrating a pixel padding method according to another embodiment of the disclosure.

According to another embodiment of the disclosure, a pixel padding area in which pixel values are padded may be subjected to a blur processing based on motion information of an input image frame. Specifically, the processor 120 may blur a pixel padding area based on a location of a foreground area identified in the input image frame and the motion information of the input image frame.

Figure 8A:
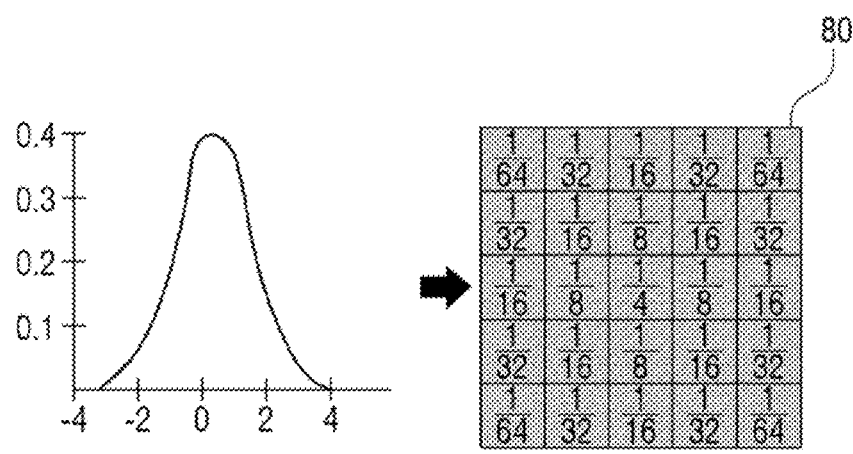
FIGS. 8A to 8C are views illustrating a blurring processing method according to another embodiment.

As an example, as shown in FIG. 8A, when the pixel value of the foreground area 810 is included in the pixel padding area 331, the processor may maintain an area 331 in which pixel values are padded when motion information of a corresponding frame is less than a threshold value.

Figure 8B:
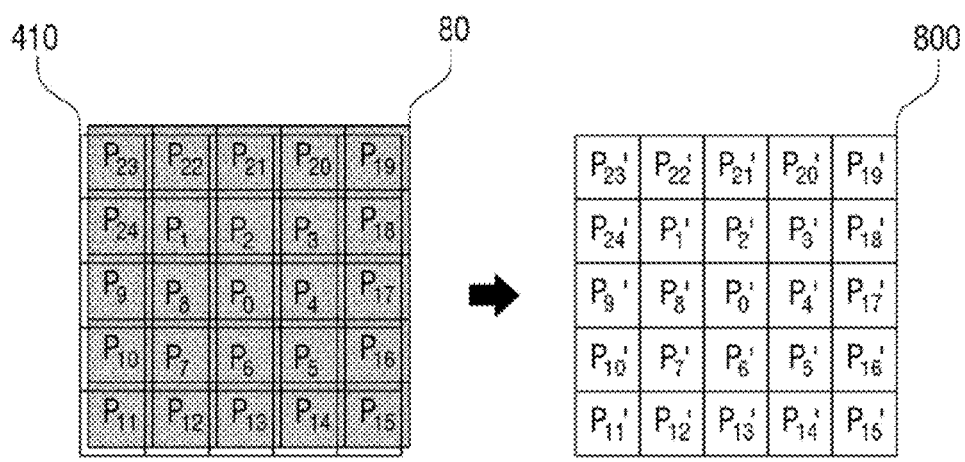

As another example, as illustrated in FIG. 8B, when the pixel value of the foreground area 820 is included in the pixel padding area 331, the processor 120 may blur the area 331 padded in which pixel values are padded when motion information of a corresponding frame is greater than or equal to the threshold value.

Figure 8C:
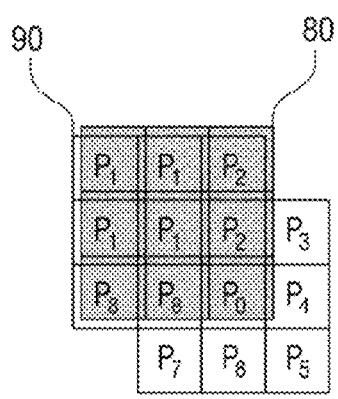

FIGS. 8A to 8C are views illustrating a blurring processing method according to another embodiment of the disclosure.

In order to blur the pixel padding area 331 according to another embodiment of the disclosure, the processor 120 may apply a low-pass filter for filtering high-frequency components. For example, the processor 120 may perform Gaussian blurring (or Gaussian filtering) processing. Gaussian blurring is a method of blurring using a Gaussian filter based on a Gaussian probability distribution, and when the Gaussian filter is applied to the pixel padding area 331, high-frequency components may be cut off to perform blur processing.

For example, in the Gaussian filter, as shown in FIG. 8A, 0 on the x-axis has a large weight, and a weight decreases toward the +/− part. When such a Gaussian filter is applied to a mask 80 having a 5*6 shape, a weight of the center of the mask 80 may be large, and the weight may decrease toward the edge of the mask 80. However, numerical values shown in FIG. 6A are examples, and the filtering values may vary depending on a sigma value of Gaussian function.

As illustrated in FIG. 8B, the processor 120 may apply the Gaussian mask 80 to each pixel value included in the pixel padding area 331 to perform Gaussian blurring on the pixel padding area 331. Specifically, the processor 120 may perform filtering on each pixel value while moving the Gaussian mask 80 such that each pixel value included in the pixel padding area 331 is located at the center of the Gaussian mask 80.

In this case, the processor 120 may perform filtering on the pixel value located at the boundary of the pixel padding area 331 based on a mirrored pixel value. For example, when filtering is performed by placing the pixel value at the (1,1) position of the pixel padding area 331, that is, P1 at the center of the Gaussian mask 80, after generating a virtual patch 90 centered on the P1 value by mirroring pixel values at the boundary positions, filtering may be performed by placing the P1 value at the center of the Gaussian mask 80, as illustrated in FIG. 8C. However, in FIG. 6C, for convenience of description, it has been described as a case of using a 3*3 Gaussian mask 80 and a patch 90 in the form of a 3*3 based on a 3*3 pixel block, but a 5*5 Gaussian mask and a patch may be used as in 6A and 6B.

As such, the processor 120 may acquire the blurred pixel padding area 331 by performing Gaussian filtering on all pixel values included in the pixel padding area 331.

Figure 9:
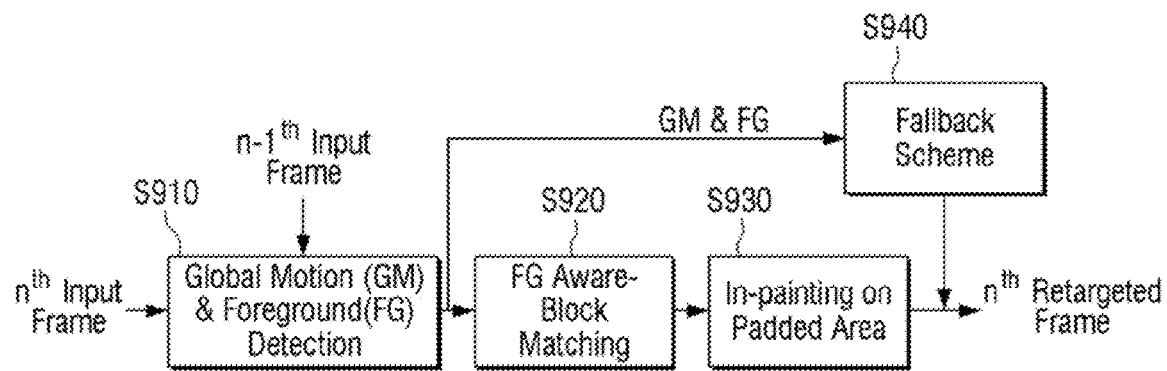
FIG. 9 is a block diagram illustrating an image processing method according to an embodiment.

FIG. 9 is a block diagram illustrating an image processing method according to an embodiment of the disclosure.

As illustrated in FIG. 9, when an n-th frame is input, a foreground area may be detected, and motion information (e.g., global motion information) may be acquired based on a n−$1^{st}$ frame and the n-th frame (S910).

A padding block for padding a target pixel block may be searched in consideration of the position of the detected foreground area (S920). After that, the image of the pixel padding block 331 may be in-painting by using pixel values of the searched similar pixel block (S930).

Meanwhile, the pixel padding block 331 may be maintained or blurred according to global motion information and the location of the foreground area (S940).

Figure 10:
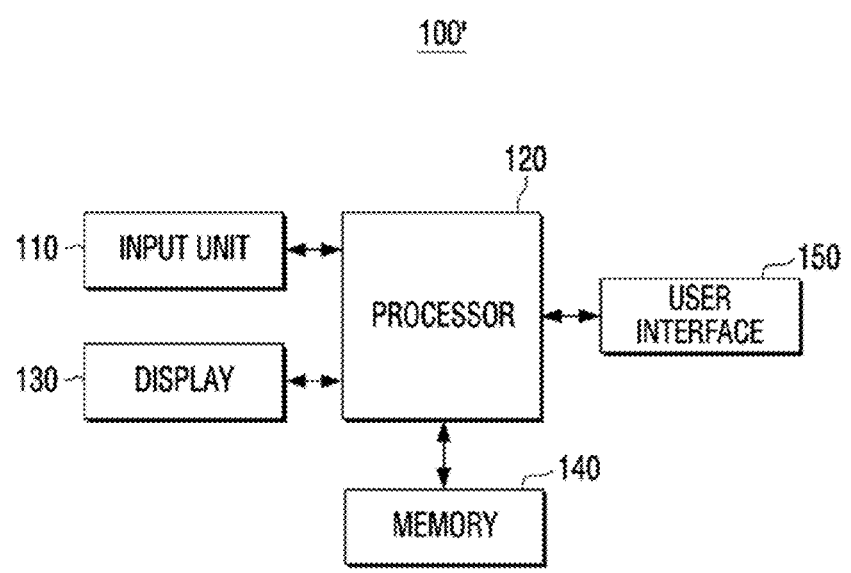
FIG. 10 is a view illustrating an example implementation of an image processing apparatus according to another embodiment.

FIG. 10 is a view illustrating an example configuration of an image processing apparatus according to another embodiment.

According to FIG. 10, a display apparatus 100' includes a communicator 110, a processor 120, a display 130, a memory 140 and a user interface 150.

The display 130 may be implemented as various types of displays, such as an liquid crystal display (LCD), an organic light emitting diodes (OLED) display, a plasma display panel (PDP), or the like. The display 160 may include a driving circuit, a backlight unit, and the like which may be implemented in forms such as an a-si TFT, a low temperature poly silicon (LTPS) TFT, an organic TFT (OTFT), or the like. The display 130 may be realized as a touch screen coupled with a touch sensor, a flexible display, a 3-dimensional (3D) display, or the like.

In addition, the display 130 according to an embodiment of the disclosure may include a bezel housing the display panel as well as a display panel that outputs an image. Specifically, according to an embodiment of the disclosure, the bezel may include a touch sensor (not shown) for detecting user interaction.

The processor 120 may control the display 130 to display an image processed according to various embodiments of the disclosure.

According to an embodiment, the processor 120 may perform a graphic processing function (video processing function). For example, the processor 120 may generate a screen including various objects such as an icon, an image, a text, etc. using a calculator (not shown) and a renderer (not shown). The calculator (not illustrated) calculates attribute values, such as coordinate values at which each object will be represented, forms, sizes, and colors according to a layout of the screen, based on the received control instruction. The renderer (not illustrated) creates screens of various layouts including the objects based on the attribute values which are calculated by the calculator (not illustrated). The processor 120 may perform various image processing processes such as decoding, scaling, noise filtering, frame rate conversion, and resolution conversion on audio data.

The processor 120 may perform processing on audio data. The processor 120 may perform various processes, such as decoding, amplification, and noise filtering of the audio data.

The memory 140 may store data necessary for various embodiments of the disclosure. For example, the memory 140 may be implemented as an internal memory such as a ROM (e.g., an electrically erasable programmable read-only memory (EEPROM)) or a RAM included in the processor 120, or may be implemented as a separate memory from 120. In this case, the memory 140 may be implemented in the form of a memory embedded in the image processing apparatus 100 according to the purpose of data storage, or may be implemented in the form of a memory that is detachable to the image processing apparatus 100. For example, data for driving the image processing apparatus 100 may be stored in the memory embedded in the image processing apparatus 100, and may be stored in the memory that is detachable from the image processing apparatus 100 in the case of data for an extended function of the image processing apparatus 100. Meanwhile, a memory embedded in the image processing apparatus 100 may be implemented as at least one of a volatile memory (e.g., dynamic RAM (DRAM), static RAM (SRAM), or synchronous dynamic RAM (SDRAM)), and non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash, NOR flash, etc.), hard drive, or solid state drive (SSD)), and a memory that is detachable to the image processing apparatus 100 may be implemented in the form such as a memory card (e.g., compact flash (CF), secure digital (SD)), micro secure digital (Micro-SD), mini secure digital (Mini-SD), extreme digital (xD), multi-media card (MMC), etc.), an external memory (e.g., USB memory) connectable to a USB port, or the like.

The user operator 150 may be implemented to be device such as button, touch pad, mouse and keyboard, or may be implemented to be touch screen that can also perform the function of the above-described display function and manipulation input function. The button may include various types of buttons, such as a mechanical button, a touch pad, a wheel, etc., which are formed on the front, side, or rear of the exterior of a main body.

Meanwhile, the image processing apparatus 100 may additionally include a tuner and a demodulator according to an implementation example.

The tuner (not shown) may receive an RF broadcast signal by tuning a channel selected by the user or all previously stored channels among radio frequency (RF) broadcast signals received through an antenna.

The demodulator (not shown) may receive and demodulate the digital IF signal DIF converted by the tuner, and may perform channel decoding or the like.

Figure 11:
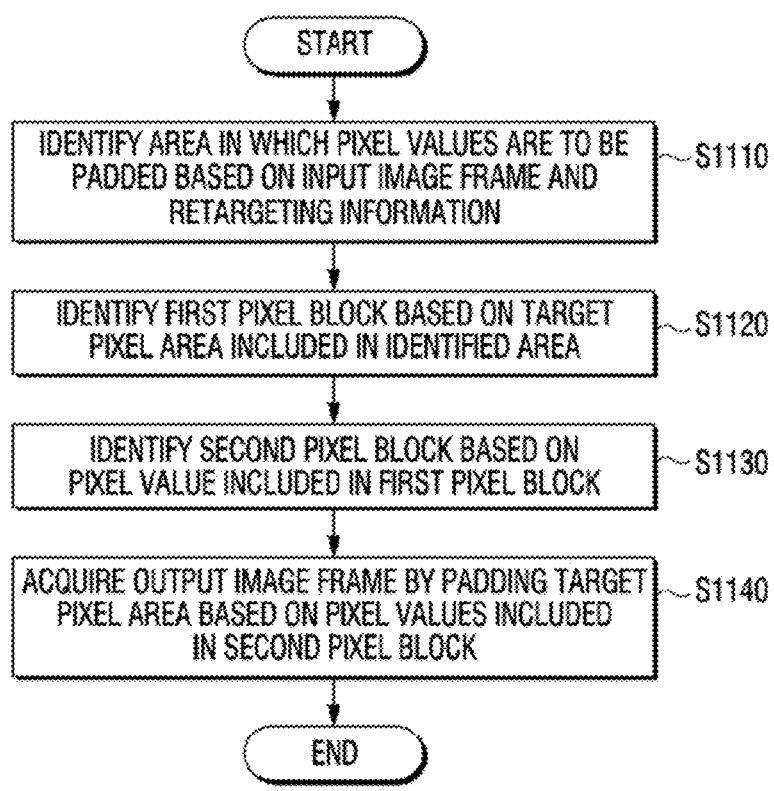
FIG. 11 is a flowchart illustrating an image processing method according to an embodiment.

FIG. 11 is a flowchart illustrating an image processing method according to an embodiment of the disclosure.

According to the image processing method illustrated in FIG. 11, an area in which pixel values are to be padded may be identified based on information on an output image frame and an input image frame (S1110).

A first pixel block may be identified based on a target pixel area included in the identified area (S1120).

A second pixel block may be identified based on pixel values stored in the first pixel block (S1130), an output image frame may be acquired by padding a target pixel area based on pixel values included in the second pixel block (S1140).

In this case, the operation S1130 of identifying the second pixel block, an input image frame may be scaled based on an aspect ratio of the input image frame, and an area in which pixel values are to be padded may be identified based on information on the scaled image frame and the output image frame, and the second pixel block may be identified in the scaled image frame.

In addition, the operation of S1130 of identifying the second pixel block, the second pixel block may be identified by searching for a pixel block having a pixel value that has a similarity to the pixel values included in the first pixel block equal to or greater than a threshold value.

Also, in the operation S1130 of identifying the second pixel block, a foreground area may be identified in the input image frame, and re-search may be performed when a second pixel block is searched in at least one of the foreground area or the adjacent area.

An operation of S1140 acquiring an output image frame, the pixels included in the first pixel block may be padded with pixel values of corresponding pixels among the pixels included in the second pixel block.

In the operation S1140 of acquiring the output image frame, some pixels having a pixel value among pixels included in the first pixel block may be replaced with pixel values calculated based on the pixel values of the corresponding pixel among the corresponding pixel value and the second pixel block.

Also, in the operation S1140 of acquiring an output image frame, a pixel included in the target pixel area may be padded with pixel values of the corresponding pixel among pixels included in the second pixel block.

In addition, it may further include acquiring motion information of the input image frame, and performing blurring of an area in which pixel values are to be padded based on the motion information.

In this case, when the foreground area in the input image frame is included in the area in which pixel values are padded, if motion information is greater than or equal to a threshold value, the area in which the pixel values are padded may be blurred, and when the motion information is less than the threshold value, the area in which the pixel values are padded may be maintained.

The operation S1140 of acquiring an output image frame, a target pixel area of each of a plurality of frames included in a predetermined frame section may be padded with pixel values included in the second pixel block.

Also, the aspect ratio of the input image may be adjusted based on the output information of the display, an area in which pixel values are to be padded may be identified based on the image whose aspect ratio is adjusted, and the acquired output image frame may be displayed through the display.

According to the various embodiments described above, it is possible to minimize distortion of image content while maintaining temporal coherency, which was not possible to achieve from a conventional cropping-based method (technique that cuts out only a partial area based on horizontal or vertical axis of an image regardless of the image characteristics), a seam carving-based method (technique to adjust an aspect ratio by finding unimportant connected lines in the image and increasing or decreasing the area with the found lines) or warping-based method (technique that adjusts a desired aspect ratio by partially increasing or reducing the image depending on an importance by determining the importance of each pixel in the image).

However, various embodiments of the disclosure may be applied not only to an image processing apparatus, but also to all image processing apparatuses capable of image processing, such as an image receiving device such as a set-top box, a display device such as a TV, or the like.

Meanwhile, the above-described methods according to various embodiments of the disclosure may be implemented in forms of an application that can be installed in an existing image processing apparatus.

The methods according to the above-described example embodiments may be realized only by upgrading software or upgrading hardware of an existing image processing apparatus.

In addition, the various embodiments of the disclosure described above may be performed through an embedded server provided in the image processing apparatus, or through at least one external server among the image processing apparatus and the display apparatus.

Meanwhile, the various example embodiments described above may be implemented as an S/W program including an instruction stored on machine-readable (e.g., computer-readable) storage media. The machine is an apparatus which is capable of calling a stored instruction from the storage medium and operating according to the called instruction, and may include an electronic apparatus (e.g., an electronic apparatus A) according to the above-described example embodiments. When the instruction is executed by a processor, the processor may perform a function corresponding to the instruction directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an example embodiment, the method according to the various example embodiments described above may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program module, or other component, according to various exemplary embodiments, may be sequential, parallel, or both, executed iteratively or heuristically, or at least some operations may be performed in a different order, omitted, or other operations may be added.

The foregoing exemplary embodiments and advantages are merely exemplary and are not to be construed as limiting the disclosure. The present teaching may be readily applied to other types of apparatuses. Also, the description of the exemplary embodiments of the disclosure is intended to be illustrative, and not to limit the scope of the claims, and many alternatives, modifications, and variations will be apparent to those skilled in the art.

What is claimed is:

1. An image processing apparatus comprising:
an input unit; and
a processor configured to retarget an image frame input through the input unit and acquire an output image frame,
wherein the processor is configured to:
identify an area, in which pixel values are to be padded, based on the input image frame and information on the output image frame,
identify a first pixel block based on a target pixel area included in the identified area,
identify a second pixel block based on pixel values included in the first pixel block and acquire the output image frame by padding the target pixel area based on pixel values included in the second pixel block,
wherein the processor is further configured to:
identify the second pixel block by searching pixel values included in the first pixel block and a pixel block having similarity greater than or equal to a threshold value,
identify a foreground area in the input image frame, and perform re-research based on the second pixel block being searched in at least one of the foreground area or an adjacent area, and wherein the processor is further configured to:
sum pixel values of some pixels among pixels included in the first pixel block and pixel values of corresponding pixel among the second pixel block and divide a value of the sum by a number of sums to obtain a calculated pixel value, and
replace the some pixels with the calculated pixel value.

2. The apparatus of claim 1, wherein the processor is configured to scale the input image frame based on an aspect ratio of the input image frame, identify the area to be padded based on the scaled image frame and information about the output image frame, and identify the second pixel block in the scaled image frame.

3. The apparatus of claim 1, wherein the processor is configured to pad pixels included in the target pixel area with pixel values of corresponding pixel among the pixels included in the second pixel block.

4. The apparatus of claim 1, wherein the processor is configured to acquire motion information of the input image frame, and blur the area in which the pixel values are padded based on the motion information.

5. The apparatus of claim 4, wherein the processor is configured to, based on the foreground area of the input image frame being included in the area in which the pixel values are padded, blur the area in which the pixel values are padded based on the motion information being equal to or greater than a threshold value, and maintain the area in which the pixel values are padded based on the motion information being less than the threshold value.

6. The apparatus of claim 1, wherein the processor is configured to pad the target pixel area of each of a plurality of fames included in a predetermined frame section with pixel values included in the second pixel block.

7. The apparatus of claim 1, further comprising:
a display,
wherein the processor is configured to control the display to display the acquired output image frame.

8. An image processing method of retargeting an input image frame to acquire an output image frame, the method comprising:
identifying an area, in which pixel values are to be padded, based on the input image frame and information on the output image frame, identify a first pixel block based on a target pixel area included in the identified area;
identifying a second pixel block based on pixel values included in the first pixel block; and
acquiring the output image frame by padding the target pixel area based on pixel values included in the second pixel block,
wherein the identifying the second pixel comprises:
identifying the second pixel block by searching pixel values included in the first pixel block and a pixel block having similarity greater than or equal to a threshold value, and
identifying a foreground area in the input image frame, and perform re-research based on the second pixel block being searched in at least one of the foreground area or an adjacent area, and
wherein the acquiring the output image comprises:
summing pixel values of some pixels among pixels included in the first pixel block and pixel values of corresponding pixel among the second pixel block and dividing a value of the sum by a number of sums to obtain a calculated pixel value, and
replacing the some pixels with the calculated pixel value.

9. The method of claim 8, wherein the identifying the second pixel block is configured to scale the input image frame based on an aspect ratio of the input image frame, identify the area to be padded based on the scaled image frame and information about the output image frame, and identify the second pixel block in the scaled image frame.

10. The method of claim 8, wherein the identifying the second pixel block is configured to identify the second pixel block by searching pixel values included in the first pixel block and a pixel block having similarity greater than or equal to the threshold value.

11. A non-transitory computer-readable medium, when executed by a processor of an image processing apparatus that retargets an image frame to acquire an output image frame, storing computer instructions such that the image processing apparatus performs an operation, the operation comprising:
identifying an area, in which pixel values are to be padded, based on the input image frame and information about the output image frame, identify a first pixel block based on a target pixel area included in the identified area;
identifying a second pixel block based on pixel values included in the first pixel block; and
padding the target pixel area based on pixel values included in the second pixel block to acquire the output image frame,
wherein the identifying the second pixel comprises:
identifying the second pixel block by searching pixel values included in the first pixel block and a pixel block having similarity greater than or equal to a threshold value, and
identifying a foreground area in the input image frame, and perform re-research based on the second pixel block being searched in at least one of the foreground area or an adjacent area, and
wherein the acquiring the output image comprises:
summing pixel values of some pixels among pixels included in the first pixel block and pixel values of corresponding pixel among the second pixel block and dividing a value of the sum by a number of sums to obtain a calculated pixel value, and
replacing the some pixels with the calculated pixel value.

12. The apparatus of claim 1, wherein the processor is further configured to:
based on the foreground being identified on both ends of a first image frame after a scene is changed, apply uniform scaling using a fallback technique instead of the retargeting of image frames included in the changed scene.

13. The apparatus of claim 1, wherein the processor is further configured to:
identify the second pixel block in a first frame among a plurality of frames included in a same scene section; and
pad remaining frames among the plurality of frames with a pixel value at a relative position of the first pixel in the second pixel block determined in the first frame.

14. The apparatus of claim 13, wherein the processor is further configured to:
based on pixel values of a pixel padding area included in the first frame being determined in the same scene section, determining pixel values of a subsequent frame by applying a weight to the pixel values of the pixel padding area.

15. The apparatus of claim 1, wherein the processor is further configured to:

perform a pixel padding in a current scene by using a relative position of pixels used for padding in the previous scene or perform a pixel padding using a value of pixel position moved to padding in a plurality of previous scenes according to image characteristics of each scene in the current scene in order to maintain temporal coherency.

* * * * *